(12) United States Patent
Szeto et al.

(10) Patent No.: US 6,597,305 B2
(45) Date of Patent: Jul. 22, 2003

(54) HAZARD AND TARGET ALERTING FOR WEATHER RADAR

(75) Inventors: Roland Y. Szeto, Seattle, WA (US); Bill G. Cornell, Bellevue, WA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/080,192

(22) Filed: Feb. 19, 2002

(65) Prior Publication Data

US 2003/0016156 A1 Jan. 23, 2003

Related U.S. Application Data

(60) Provisional application No. 60/306,269, filed on Jul. 17, 2001.

(51) Int. Cl.[7] .............................. G01S 13/95; G01S 7/40
(52) U.S. Cl. .............................. 342/26; 342/89; 342/90; 342/91; 342/118; 342/165; 342/173; 342/175; 342/176; 342/195; 702/1; 702/2; 702/3; 340/540; 340/601
(58) Field of Search ................................. 701/300, 301, 701/302; 342/26, 27, 28, 29, 30, 31, 32, 41, 89, 90, 91, 92, 93, 118, 119, 175–186, 195, 159, 165, 166–174, 134–145; 340/500, 501, 514–525, 540, 601, 602, 901; 702/1, 2, 3, 4

(56) References Cited

U.S. PATENT DOCUMENTS

| | | | |
|---|---|---|---|
| 3,025,514 A | 3/1962 | Alexander et al. | |
| 4,940,987 A | 7/1990 | Frederick | 342/26 |
| 5,059,967 A | 10/1991 | Roos | 342/26 |
| 5,077,558 A | 12/1991 | Kuntman | |
| 5,202,690 A | 4/1993 | Frederick | 342/26 |
| 5,311,183 A | * 5/1994 | Mathews et al. | 342/26 |
| 5,648,782 A | * 7/1997 | Albo et al. | 342/26 |
| 5,781,146 A | 7/1998 | Frederick | 342/26 |
| 5,828,332 A | 10/1998 | Frederick | 342/26 |
| 5,920,276 A | 7/1999 | Frederick | 342/26 |

OTHER PUBLICATIONS

L. Alparone, G. Benelli, A. Vaniluca; Texture–based analysis techniques for the classification of radar images; IEE Proceedings, vol. 137, Pt. F. No. 4, Aug. 1990.

* cited by examiner

*Primary Examiner*—Bernarr E. Gregory
(74) *Attorney, Agent, or Firm*—Honeywell International Inc.

(57) ABSTRACT

A system, method, and computer program product for alerting a flight crew of weather radar return data collected, yet not presently being displayed. The system includes a memory, a processor, and an output device. The memory stores radar return information in a three-dimensional buffer. The processor determines if any radar return information stored in a three-dimensional buffer is within a threshold distance from an aircraft's present position and generates an image based on target data stored in the three-dimensional buffer and selected display parameters. The processor also generates a target alert if any target data is determined to be within a threshold distance from the aircraft's present position and is not included in the generated image. The output device presents the generated target alert.

18 Claims, 3 Drawing Sheets

HAZARD AND TARGET ALERTING FOR WEATHER RADAR

COPENDING APPLICATIONS

This invention claims priority from co-pending U.S. Provisional Patent Application No. 60/306,269, filed Jul. 17, 2001.

This invention relates to copending applications U.S. patent application Ser. No. 10/080,197, U.S. patent application Ser. No. 10/080,180, and U.S. patent application Ser. No. 10/079,477, all filed on Feb. 19, 2002.

BACKGROUND OF THE INVENTION

In present-day aircraft radar systems, a single sweep of radar data is collected and displayed on a display for the pilot. Because only a single sweep of radar data is being displayed, large amounts of space are not being examined at all. This unexamined space may contain weather hazards.

Some have attempted to allow a pilot to simultaneously view weather information from various regions of space. For example, U.S. Pat. Nos. 4,940,987; 5,202,690; 5,781,146; 5,828,332; 5,920,276, to Frederick present storing radar return data into a three-dimensional array that is apparently based on the tilt of the radar. '987 presents generating a plan view that is selected according to tilt. The plan view image displays a span over a range of altitudes. Therefore, in order for a pilot to determine if an altitude above or below the aircraft's present altitude is clear of any weather hazards, the pilot must shift their visual focus to a vertical front or side view image. Frederick also fails to identify radar return information not in the present radar scan.

Therefore, there exists a need to provide pilots with radar display information not presently viewed.

SUMMARY OF THE INVENTION

The present invention comprises a system, method, and computer program product for alerting a flight crew of weather radar return information not presently being displayed. The system includes a memory, a processor, and an output device. The memory stores radar return information in a three-dimensional buffer. The processor determines if any radar return information stored in a three-dimensional buffer is within a threshold distance from an aircraft's present position and generates an image based on target data stored in the three-dimensional buffer and selected display parameters. The processor also generates a target alert if any target data is determined to be within a threshold distance from the aircraft's present position and is not included in the generated image. The output device presents the generated target alert.

In accordance with further aspects of the invention, the first component further determines if the target data that is within the threshold distance from the aircraft's present position is at the same altitude as the aircraft and is along the aircraft's current heading or the aircraft's flight plan.

In accordance with other aspects of the invention, the generated target alert is an audible alarm and the output device is one or more speakers.

In accordance with still further aspects of the invention, the generated target alert is a graphical and/or textual image that indicates at least one of distance to aircraft and altitude.

In accordance with yet other aspects of the invention, the third component further generates a target alert if the radar return information determined to be within a threshold distance from the aircraft's present position is above a certain threshold reflectivity value.

As will be readily appreciated from the foregoing summary, the invention provides a device that alerts a pilot if the radar antenna has discovered any hazards to the aircraft that are not presently being displayed to the pilot.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
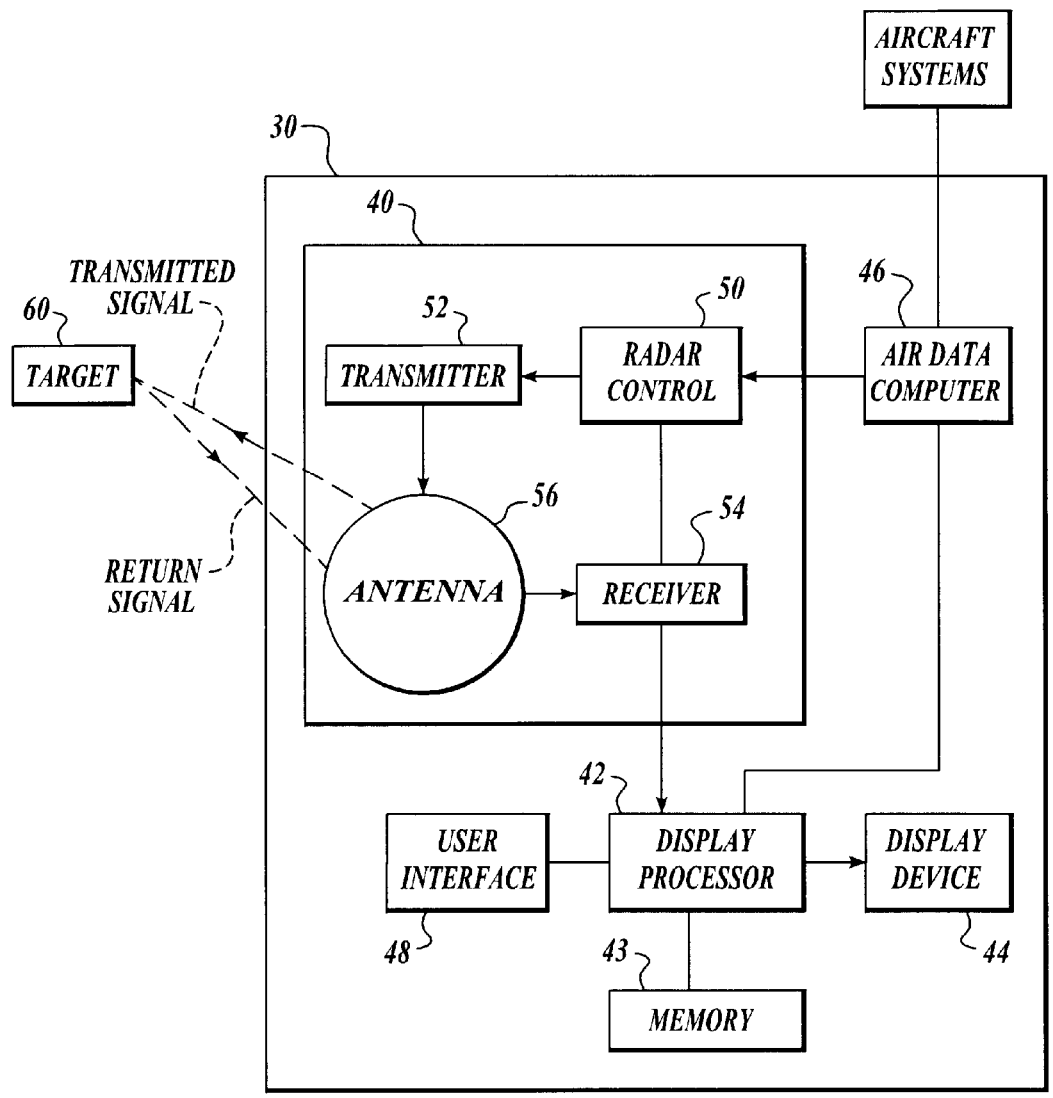
FIG. 1 is a block diagram of a system formed in accordance with an embodiment of the present invention.

The present invention is a system, method, and computer program product for alerting a pilot of radar return data not presently being displayed. FIG. 1 illustrates an example system 30 formed in accordance with the present invention. The system 30 includes a weather radar system 40, a display processor 42, memory 43, a display device 44, an air data computer 46, and user interface 48 coupled to the display processor 42. The display processor 42 is electrically coupled to the radar system 40, the display device 44, the air data computer 46, and the memory 43. An example of the radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the air data computer 46, a Flight Management System (FMS), Inertial Navigation System (INS), and/or Global Positioning System (GPS). The air data computer 46 generates air data based on signals received from various aircraft flight systems. The radar system 40 transmits radar signals from the antenna 56 into space and receives return signals (reflectivity values) if a target 60 is contacted by the transmitted radar signal. Preferably, the radar system 40 digitizes the return signals and sends the digitized signals to the display processor 42. The display processor 42 translates the received return signals for storage in a three-dimensional buffer in the memory 43. The display processor 42 then generates a two-dimensional image for presentation on the display device 44 based on any control signals sent from the user interface 48 or based on settings within the processor 42.

The translated return signals (return data), as determined by the radar system 40 or processor 42, identify certain weather targets, such as rain/moisture, windshear, or turbulence. The type of weather target identified is based on a corresponding present algorithmic interpretation of the reflectivity values. The pilot selects the type of weather identified using the user interface 48.

Figure 2:
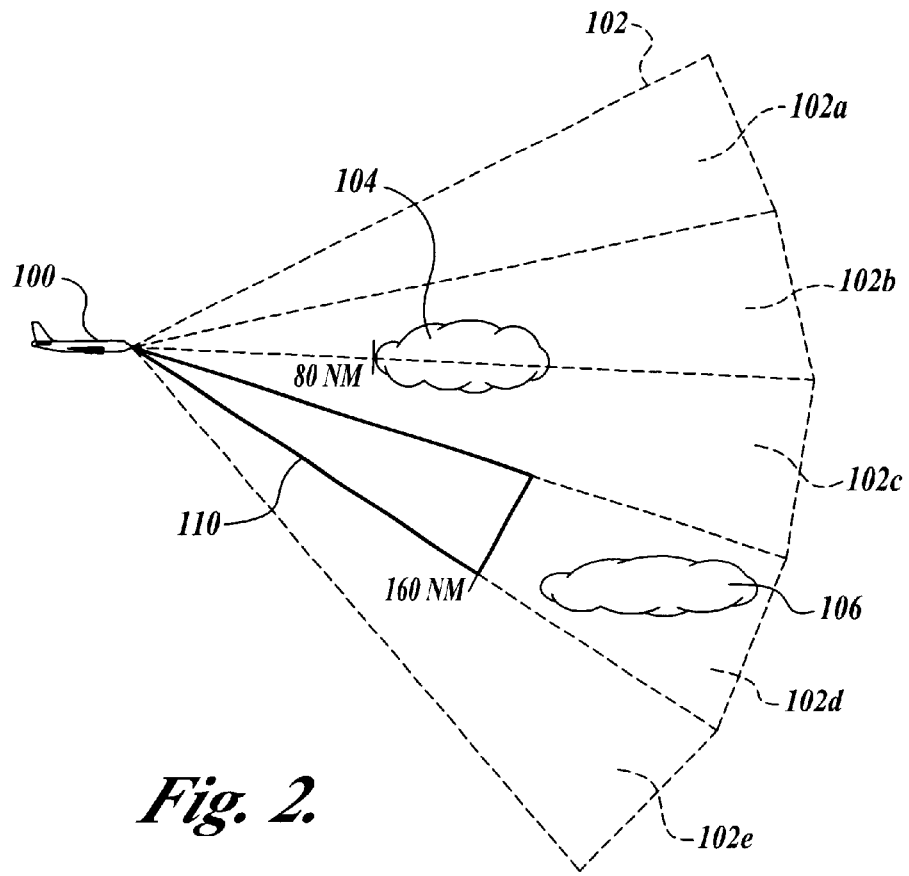
FIG. 2 is a side view of weather hazards in front of an aircraft.

FIG. 2 illustrates a side view of airspace in front of an aircraft 100. The aircraft's radar system scans a volume portion 102 of the airspace in front of the airspace and stores the associated radar return information (data) in the three-dimensional buffer. The stored radar return information is generated from multiple tilted radar antenna sweeps 102a–e. Although FIG. 2 illustrates a two-dimensional side view, the radar return information is translated into three-dimensional storage locations (voxels) of the three-dimensional buffer. The storage of data in the three-dimensional buffer is described in more detail in co-pending U.S. patent application Ser. No. 10/080,197, applicant filed Feb. 19, 2002. U.S. Pat. No. 5,059,967 to Roos describes an apparatus and method for displaying weather information and is also hereby incorporated by reference. The radar return data included in a portion 110 of sweep 102d has been selected for display in the display device 44 and is shown in FIG. 3.

Figure 3:
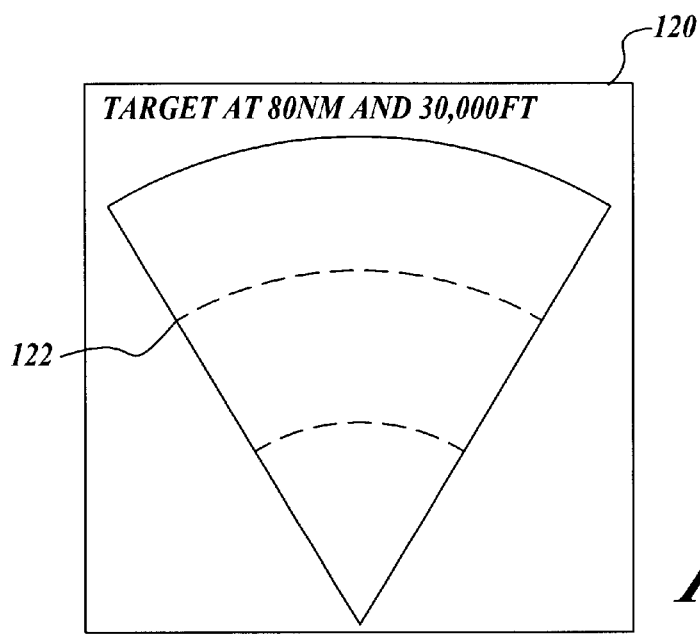
FIG. 3 is a weather radar display of a portion of the space from FIG. 2.

FIG. 3 illustrates a plan position indicator display 120 that shows a plan view image 122 of the sweep portion 110 of sweep 102d shown in FIG. 2. The plan view image 122 is preferably generated based on range and tilt angle values as selected by a user/pilot using the user interface 48. In this example, portion 110 is a volume of space beginning at the aircraft 100 and extending out to approximately 160 nautical miles. The portion 110 is approximately half the distance of the entire corresponding sweep 102d. The portion 110 is a selected region that the processor 42 scans the three-dimensional buffer to determine if there exists any return radar data, generates an image according to the scanned buffer, and displays the generated image on the plan position indicator display 120. In this example, no radar return information is stored in the voxels of the buffer that correspond to the portion 110. However, the three-dimensional buffer includes significant radar return information 106 between approximately 200 nautical miles (nm) to 300 nm from the aircraft 100 as found from the return data of sweep 102d that is not displayed. Also, more significant radar return information 104 exists at approximately 80–140 nm centered in the sweep 102b and part of sweep 102c. The present invention alerts the flight crew of return information not being displayed. For example, if the aircraft 100 is flying straight and level at 30,000 ft. and radar return information 104 is also at 30,000 ft. along the aircrafts present flight path, the processor 42 alerts the pilot that there exists a hazard not presently being displayed in the plan view 122. The processor 42 can alert the pilot of a non-display target that is within a threshold distance by a number of different methods. For example, the processor 42 can audibly alert the pilot over speakers (headset) that are part of the user interface 48. Also, as shown in FIG. 3, distance and altitude information of a non-viewed hazard is presented on the display 20.

Figure 4:
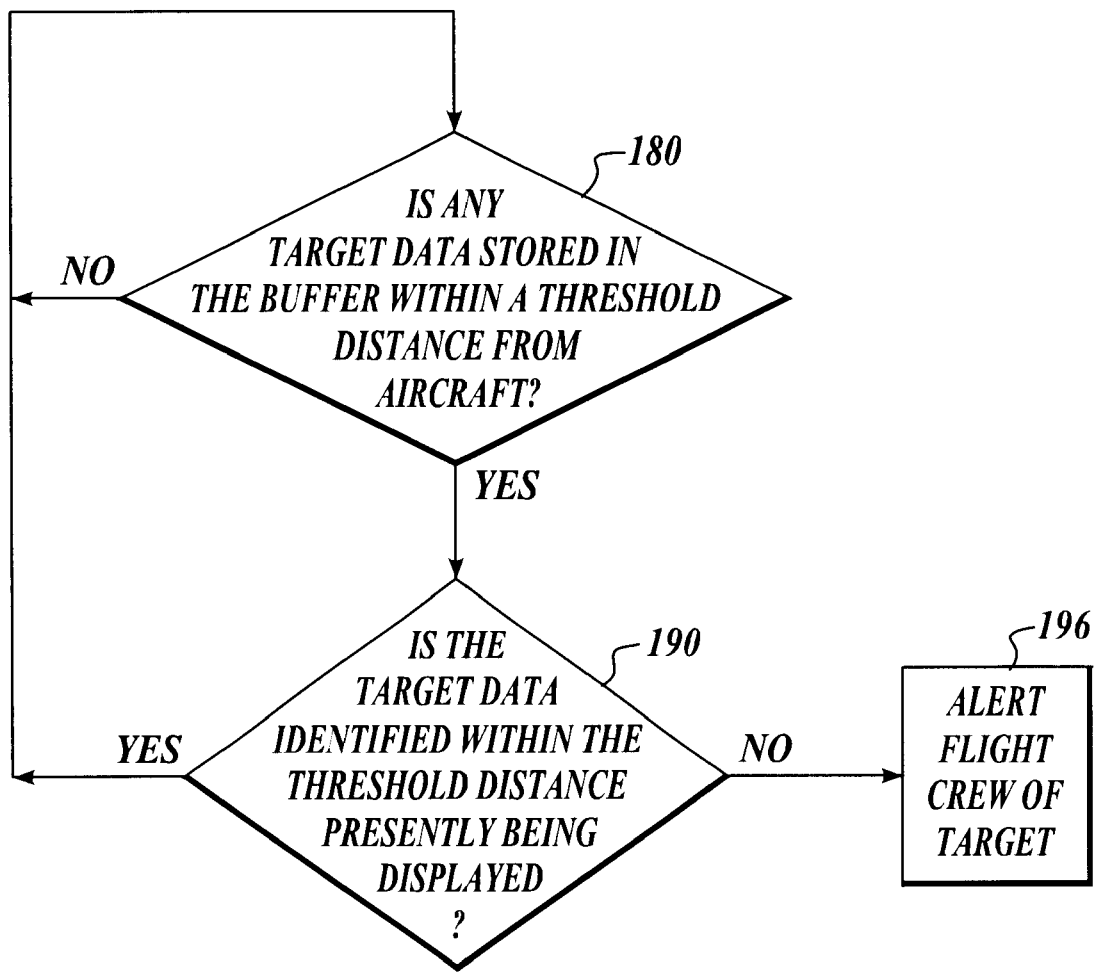
FIG. 4 is a flow diagram for identifying non-displayed weather hazards.

FIG. 4 illustrates a flow diagram performed by the system of FIG. 1 for alerting the pilot of any non-display weather hazards. First, at decision block 180, the processor 42 determines if there is any target data (radar return information) stored in the three-dimensional buffer that is within a threshold distance (altitude and/or horizontal distance) from the present aircraft's location. If there does not exist any target data within this threshold distance from the present aircraft's location, the process returns to decision block 180 to keep determining if this condition does exist. If target data does exist in the three-dimensional buffer within a threshold distance from the present aircraft's location, the processor 42, at decision block 190, determines if the presently selected and displayed radar image includes the target data determined to be within the threshold distance. If it is determined by the processor 42 that the target data is being displayed, there is no need to further alert the pilot that a target exists. The process then returns to decision block 180. However, if the processor 42 does determine that the identified target data within a threshold distance is not being displayed according to presently selected display parameters the processor 42 alerts the pilot of the target data, see block 196.

One of several algorithms generates a target alert (maximum reflectivity density, storm classification, high intensity returns). The simplest algorithm is based on magnitude of returns. Using this, if a storm was partially displayed, an alert would be generated if there is high intensity reflectivity outside of the display, even if some of the storm was being displayed. A set of logic rules (heuristics) is used to decide if a target alert will be generated that may be more complex than the concept described above.

In an alternate embodiment, the step at block 190 also includes the processor 42 determining if the radar return information is above a certain threshold reflectivity value. The return information identifies a weather hazard of some significance. Then, if there exists any return information within a threshold distance and above a threshold value, an alert is generated.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A weather radar method comprising:
   determining if any radar return information stored in a three-dimensional buffer is within a threshold distance from an aircraft's present position;
   generating an image based on target data stored in the three-dimensional buffer and selected display parameters; and
   generating a target alert if any target data is determined to be within a threshold distance from the aircraft's present position and is not included in the generated image.

2. The method of claim 1, wherein determining if any target data stored in the three-dimensional buffer is within a threshold distance from the aircraft's present position further comprises determining if the target data that is within the threshold distance from the aircraft's present position is at the same altitude as the aircraft and is along at least one of the aircraft's current heading or flight plan.

3. The method of claim 1, wherein generating a target alert comprises generating an audible alarm.

4. The method of claim 1, wherein generating a target alert comprises generating at least one of a graphical or textual image and displaying the generated at least one graphical or textual image.

5. The method of claim 4, wherein the at least one graphical or textual image indicates at least one of distance to aircraft or altitude of the non-displayed target data determined to be within a threshold distance from the aircraft's present position.

6. The method of claim 1, wherein generating a target alert comprises generating a target alert if the radar return information determined to be within a threshold distance from the aircraft's present position is above a certain threshold reflectivity value.

7. A weather radar system comprising:
   memory configured to store radar return information in a three-dimensional buffer;
   a processor coupled to the memory, the processor comprising:
      a first component configured to determine if any radar return information stored in a three-dimensional buffer is within a threshold distance from an aircraft's present position;

a second component configured to generate an image based on target data stored in the three-dimensional buffer and selected display parameters; and a third component configured to generate a target alert if any target data is determined to be within a threshold distance from the aircraft's present position and is not included in the generated image; and an output device configured to present the generated target alert.

8. The system of claim 7, wherein the first component further determines if the target data that is within the threshold distance from the aircraft's present position is at the same altitude as the aircraft and is along at least one of the aircraft's current heading or flight plan.

9. The system of claim 7, wherein the generated target alert is an audible alarm and the output device is one or more speakers.

10. The system of claim 7, wherein the generated target alert is at least one of a graphical or textual image.

11. The system of claim 10, wherein the at least one graphical or textual image indicates at least one of distance to aircraft or altitude of the non-displayed target data determined to be within a threshold distance from the aircraft's present position.

12. The system of claim 7, wherein the third component is further configured to generate a target alert if the radar return information determined to be within a threshold distance from the aircraft's present position is above a certain threshold reflectivity value.

13. A weather radar computer program product comprising:

a first component configured to store radar return information in a threedimensional buffer;

a second component configured to determine if any radar return information stored in a three-dimensional buffer is within a threshold distance from an aircraft's present position;

a third component configured to generate an image based on target data stored in the three-dimensional buffer and selected display parameters; and a fourth component configured to generate a target alert if any target data is determined to be within a threshold distance from the aircraft's present position and is not included in the generated image.

14. The product of claim 13, wherein the second component further determines if the target data that is within the threshold distance from the aircraft's present position is at the same altitude as the aircraft and is along the aircraft's current heading.

15. The product of claim 13, wherein the generated target alert is an audible alarm and the output device is one or more speakers.

16. The product of claim 13, wherein the generated target alert is at least one of a graphical or textual image.

17. The product of claim 16, wherein the at least one graphical or textual image indicates at least one of distance to aircraft or altitude of the non-displayed target data determined to be within a threshold distance from the aircraft's present position.

18. The product of claim 13, wherein the fourth component is further configured to generate a target alert if the radar return information determined to be within a threshold distance from the aircraft's present position is above a certain threshold reflectivity value.

* * * * *